United States Patent
Forney

(10) Patent No.: US 11,661,320 B2
(45) Date of Patent: May 30, 2023

(54) WINCH

(71) Applicant: Robert Forney, Philadelphia, PA (US)

(72) Inventor: Robert Forney, Philadelphia, PA (US)

( * ) Notice: Subject to any disclaimer, the term of this patent is extended or adjusted under 35 U.S.C. 154(b) by 207 days.

(21) Appl. No.: 17/303,971

(22) Filed: Jun. 11, 2021

(65) Prior Publication Data
US 2022/0009755 A1     Jan. 13, 2022

Related U.S. Application Data

(60) Provisional application No. 63/049,150, filed on Jul. 8, 2020.

(51) Int. Cl.
| | |
|---|---|
| *B66D 1/14* | (2006.01) |
| *F16D 43/202* | (2006.01) |
| *F16H 1/22* | (2006.01) |

(52) U.S. Cl.
CPC ............ *B66D 1/14* (2013.01); *F16D 43/2024* (2013.01); *F16H 1/222* (2013.01)

(58) Field of Classification Search
CPC ... B66D 1/02; B66D 1/04; B66D 1/14; B66D 1/24; B66D 2700/0141; B66D 2700/0116; B66D 2700/0183; B60P 7/06; F16H 1/16; F16H 1/20; F16H 1/22; F16H 1/222; F16G 11/12; F16D 43/2024

USPC ......................................................... 254/343
See application file for complete search history.

(56) References Cited

U.S. PATENT DOCUMENTS

| | | | | |
|---|---|---|---|---|
| 1,459,032 | A * | 6/1923 | Norling | F01B 17/02 |
| | | | | 254/284 |
| 1,949,015 | A * | 2/1934 | Hallenbeck | B66D 1/24 |
| | | | | 74/125.5 |
| 2,678,191 | A * | 5/1954 | Jensen | B66D 3/12 |
| | | | | 74/505 |
| 3,799,005 | A * | 3/1974 | Koehler | B66D 1/04 |
| | | | | 254/354 |
| 6,499,197 | B1 * | 12/2002 | Huang | A44B 11/125 |
| | | | | 24/71 ST |
| 6,554,255 | B2 * | 4/2003 | Fujikawa | B66D 3/16 |
| | | | | 254/342 |
| 7,216,849 | B2 * | 5/2007 | Tremblay | B60P 7/0846 |
| | | | | 24/69 ST |
| 8,256,745 | B2 * | 9/2012 | Latoria | B66D 3/18 |
| | | | | 254/362 |
| 10,088,016 | B2 * | 10/2018 | Bujold | B60P 7/0853 |

FOREIGN PATENT DOCUMENTS

CN        201254301 Y * 6/2009

* cited by examiner

*Primary Examiner* — Michael R Mansen
*Assistant Examiner* — Henrix Soto

(57) ABSTRACT

A small, portable, powered winch that may employ a power drill or socket wrench.

7 Claims, 4 Drawing Sheets

100

WINCH

TECHNICAL FIELD

The invention relates in general to portable winches and winching mechanisms.

BACKGROUND

Winches are well-known mechanical devices for pulling, winding out or adjusting tension of a rope or cable. Portable winches have the advantage of adaptability to varied uses in the field or domestically. Among portable winches known in the art, some employ gear assemblies; some are electrically powered. Electrically powered, portable winches employing a two-stage gear reduction are comparatively less known in the art. Those with a torque-limiting clutch prevent overtightening. Some winches enable manual spooling and winching. Advancements in the art have resulted in devices in diminishing size; demand for portability with power has influenced production toward smaller devices that can handle both heavy and light loads. For example, a heavy-duty winch might pull a car onto a tow truck; a comparatively smaller winch would have similar power but be suitable for lighter jobs, such as pulling a door from its hinges or releasing a stuck window.

SUMMARY

An apparatus for pulling, winding, letting-out, or otherwise adjusting tension of a linear tensile member. In some embodiments a linear tensile member is a nylon strap with metal hooks at each end, the strap being wound on a winch. An example embodiment is a portable winch that is driven by a power drill or socket wrench.

In an example embodiment, a power drill or socket wrench is placed into an input socket to rotate a spring-clutch assembly, which actuates a winch mechanism. The spring-clutch assembly regulates the torque that is transferred to a pinion gear. The pinion gear drives a spur gear, which drives a worm gear, which in turn drives a worm wheel, also referred to as a main gear. The main gear rotates on a central axis and winds a strap on a shaft that is coaxial with the central axis. The spring-clutch assembly has a number of settings to regulate the amount of torque applied to the strap.

One skilled in the art understands that a common socket may be joined with a square shaft rotated by a power drill or socket wrench to rotate the socket and drive a winch.

A release mechanism is a linkage that disengages the drive assembly so that the strap may be rapidly spooled or unspooled free from tension or friction from the drive mechanism, also referred to as free-spooling. In some embodiments a socket is coaxial with the central axis, so that a power drill or socket wrench may be used to rapidly spool or unspool the strap. The worm gear is mounted in a movable bracket that is in turn joined with a jack screw that is in turn connected to a lever. Moving the lever rotates the jack screw, thus moving and disengaging the worm gear from the main gear to allow the strap to spool or unspool freely. One skilled in the art understands that various spring-loaded mechanisms may be employed to hold the lever in place while spooling or unspooling the strap. Releasing such a spring engages the worm gear with the main gear so that the strap may be spooled under tension.

Other objects and features will become apparent from the following detailed description considered in conjunction with the accompanying drawings. It is to be understood, however, that the drawings are designed as an illustration and not as a definition of the limits of the invention.

DESCRIPTION

Figure 1:
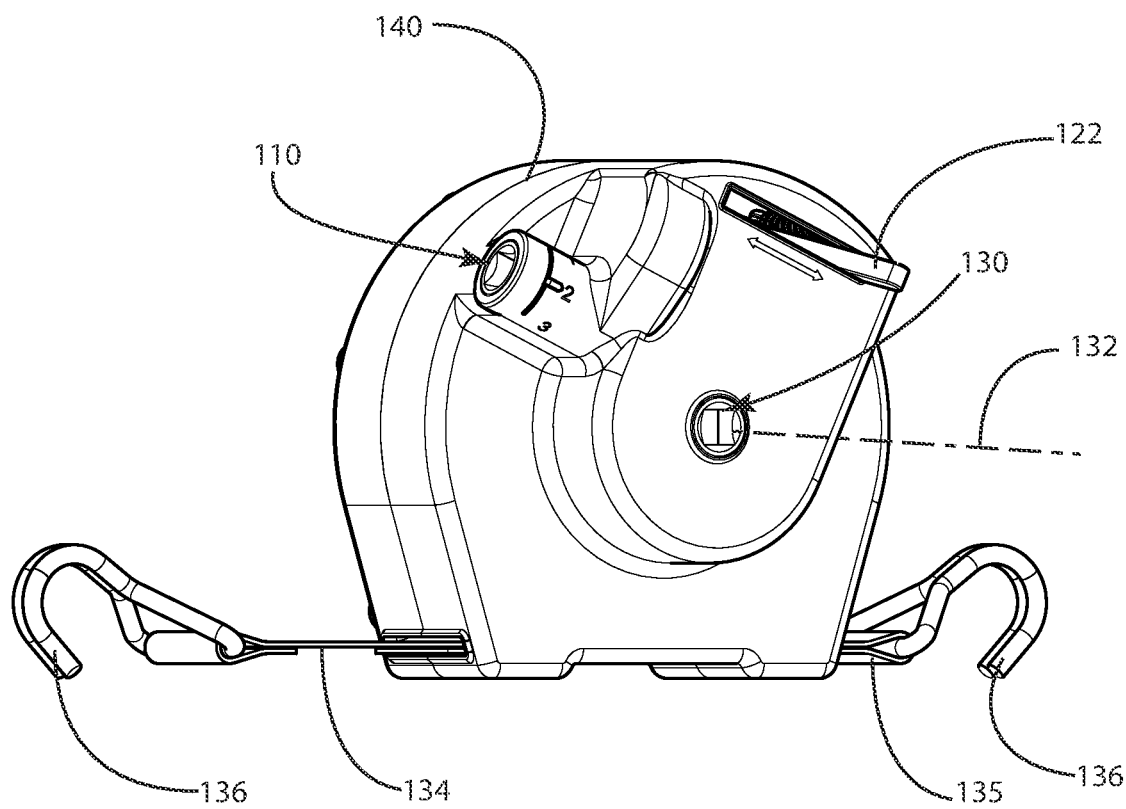
FIG. 1 is a perspective view of an example embodiment of the present disclosure.

FIG. 1 shows a perspective view of an example embodiment 100. The apparatus is contained in a housing 140 that supports an input socket 110 and a winding socket 130. A second strap 134 is affixed to the housing 140 and has a hook 136 at its distal end. A first strap 135 has a hook 136 at its distal end and is spooled about a central axis 132. A release lever 122 is used to disengage a winching mechanism FIGS. 2, 3 so that the first strap 135 may be spooled or unspooled rapidly. The winding socket 130 drives a shaft that is coaxial with the central axis 132, enabling rapid winding or unwinding of the first strap 135 by driving the socket with a power drill or socket wrench.

Figure 2:
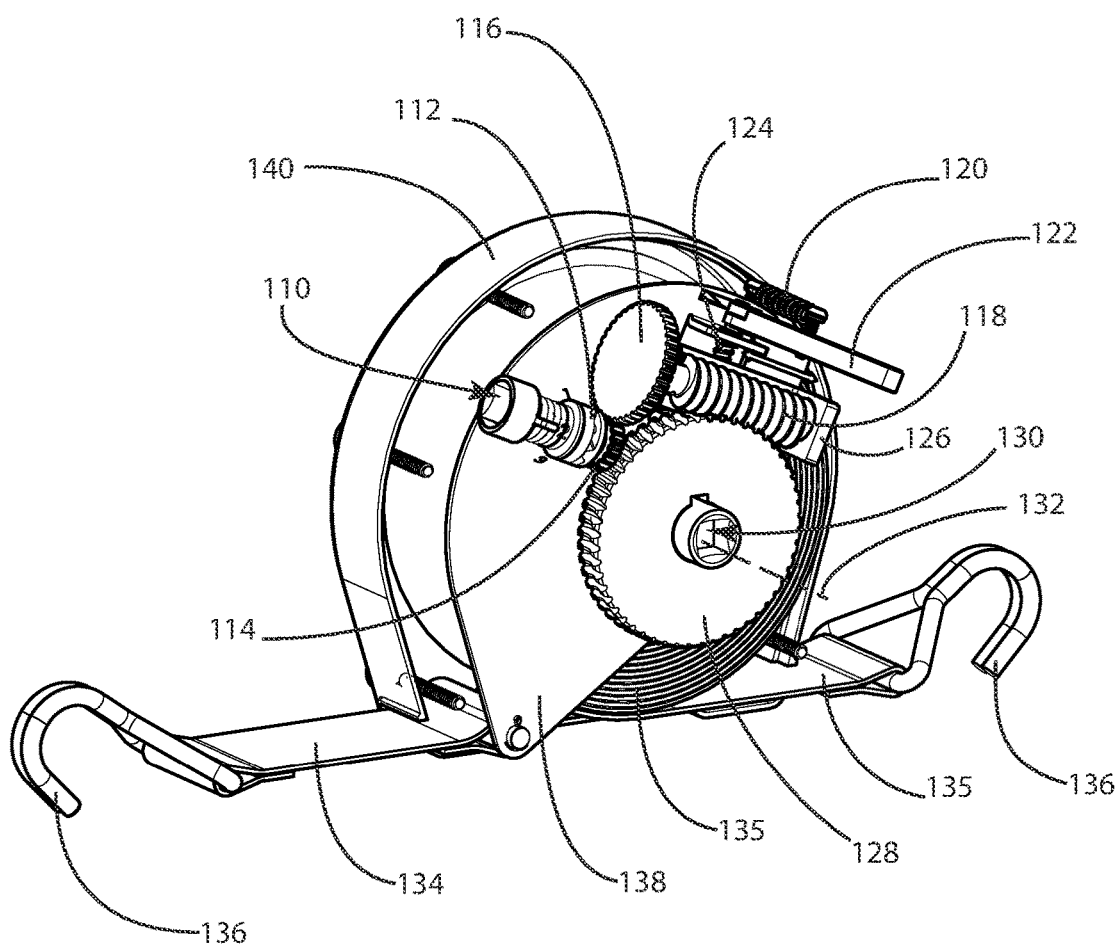
FIG. 2 is perspective, partially exploded view of an example embodiment.
Figure 3:
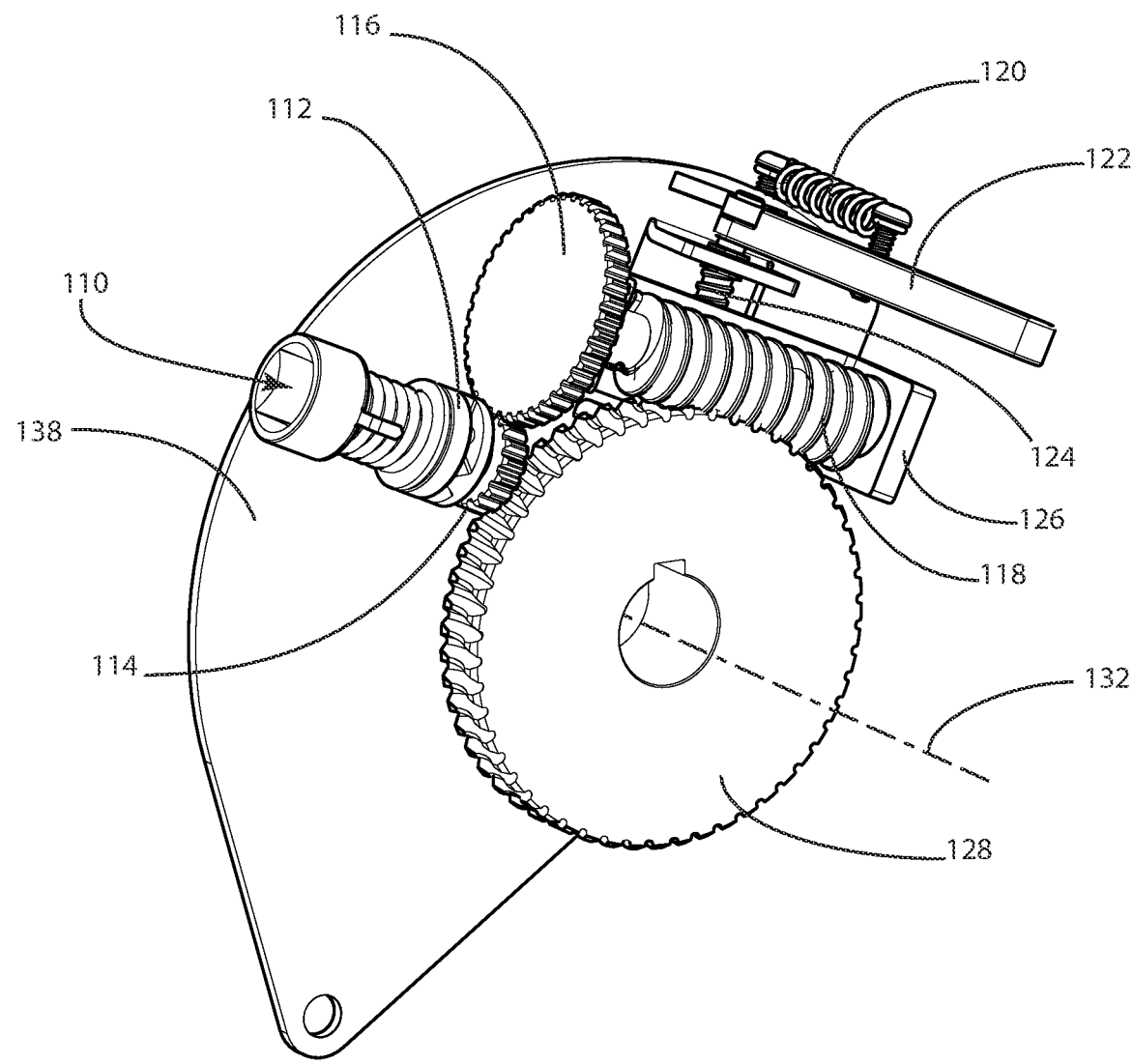
FIG. 3 is a perspective view of the drive mechanism of the example embodiment.
Figure 4:
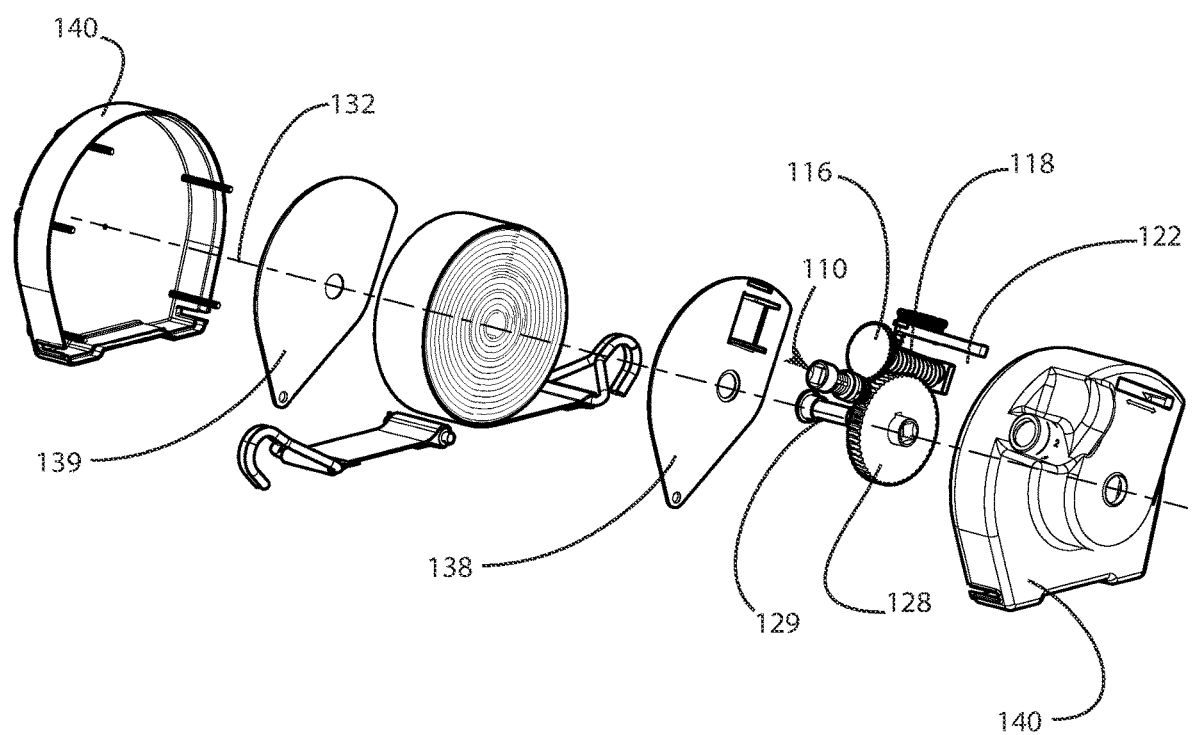
FIG. 4 is a perspective, exploded view of the example embodiment.

Referring to FIGS. 2, 3 and 4: FIG. 2 is a perspective view of the example embodiment with a portion of the housing removed to show the winching mechanism. FIG. 3 is a perspective view of the winching mechanism. FIG. 4 is a perspective, exploded view of the embodiment. In an example embodiment a winching mechanism is mounted on a mounting plate 138. An input socket 110 is designed to be rotated by a socket wrench or power drill. The input socket 110 is connected to a spring-clutch assembly 112 that regulates the torque transferred to a pinion gear 114 that in turn drives a spur gear 116. The spur gear 116 is affixed to a worm gear 118 that in turn drives a worm wheel (also referred to as a main gear) 128. The main gear 128 rotates a shaft 129 that resides along a central axis 132, and about which the first strap 135 is wound. The shaft 129 is supported by the mounting plate 138 at one end and by a mating mounting plate 139 at the other end. In the example embodiment a second strap 134 is affixed to the mounting plate 138 while the first strap 135 is spooled and unspooled about the shaft 129. The spring-clutch assembly 112 has a number of settings to regulate the amount of torque applied to the strap. One skilled in the art understands that there are various methods of joining the first strap 135 to a shaft 129 that rotates on a central axis 132.

A release mechanism disengages the drive assembly so that the first strap 135 may be rapidly spooled or unspooled. In some embodiments a winding socket 130 is coaxial with the central axis 132 and affixed to the shaft 129, so that a power drill or socket wrench may be used to rapidly spool or unspool the first strap 135. The worm gear 118 is mounted in a movable bracket 126 that communicates with a jack screw 124 which is connected to a lever 122. Moving the lever 122 rotates the jack screw 124, lifting the worm gear 118 to disengage it from the main gear 128 to allow the strap to spool or unspool freely. A spring 120 holds the lever 122 fast to keep the worm gear 118 disengaged from the main gear 128 while the first strap 135 is spooled or unspooled. One skilled in the art understands that various spring-loaded mechanisms may be employed to hold the lever in place while spooling or unspooling the strap. Releasing the spring engages the worm gear with the main gear so that the strap may be spooled under tension.

These embodiments should not be construed as limiting.

The invention claimed is:

1. A winch comprising:
a housing for supporting a mounting plate; and
an input socket rotationally engaged with said housing and configured to engage with a socket wrench; and
a pinion gear coaxial and fixedly engaged with said input socket; and
a spur gear rotationally engaged with said pinion gear; and
a worm gear coaxial with and fixedly engaged with said spur gear; and
a worm wheel rotationally engaged with said worm gear; and
a bracket engaged with said worm gear; and
said bracket rotationally engaged with a jack screw; and
said jack screw fixedly engaged with a linkage; and
a locking spring fixedly engaged with said linkage and fixedly engaged with said mounting plate;
said worm wheel fixedly engaged with a shaft about which a first strap is configured to wind;
wherein
rotating said input socket with said socket wrench provides increased torque to said shaft for winding said first strap under tension; and movement of the linkage rotates said jack screw and said linkage is held fast by said spring; and said jack screw moves said bracket and thus moves said worm gear; and
said worm gear is moved so as to disengage said worm wheel, allowing said first strap to spool and unspool without tension.

2. The winch of claim 1 wherein said socket wrench is power-driven.

3. The winch of claim 1 further comprising:
a spring clutch engaged with said input socket and further engaged with said pinion gear; wherein
the spring clutch controls the torque applied to said pinion gear and thus to the tension applied to said at least first strap.

4. The winch of claim 1 further comprising:
at least a second strap fixedly engaged with said mounting plate; and
pivotally engaged with a hook; wherein
said at least a second strap is used to mount said winch to a fixed point for winching said first strap.

5. A winch comprising:
a housing for supporting a mounting plate; and
a first input socket rotationally engaged with said housing and configured to engage with a socket wrench; and
a spring clutch engaged with said first input socket; and
said spring clutch further engaged with a pinion gear coaxial and fixedly engaged with said first input socket; and
a spur gear rotationally engaged with said pinion gear; and
a worm gear coaxial with and fixedly engaged with said spur gear; and
a worm wheel rotationally engaged with said worm gear; and
said worm wheel fixedly engaged with a shaft about which a first strap is configured to wind; and
a bracket engaged with a worm gear; and
said bracket rotationally engaged with a jack screw; and
said jack screw fixedly engaged with a linkage; and
a locking spring fixedly engaged with said linkage and fixedly engaged with said mounting plate configured to move said bracket to disengage said worm gear from said worm wheel while said locking spring is configured to hold said linkage fast; and
a winding socket fixedly engaged and coaxial with said worm wheel and configured to receive said socket wrench; wherein
rotating said first input socket with said socket wrench provides increased torque to said shaft for winding said first strap under tension; and wherein said worm gear is moved by said linkage so as to disengage said worm wheel allowing said first strap to spool and unspool without tension, and wherein rotation of a second input socket with said socket wrench spools and unspools said first strap when said worm gear is disengaged from said worm wheel.

6. The winch of claim 5 wherein said socket wrench is power-driven.

7. The winch of claim 5 further comprising:
at least a second strap fixedly engaged with said mounting plate; and
pivotally engaged with a hook; wherein
said at least a second strap is used to mount the said winch to a fixed point for winching said first strap.

* * * * *